United States Patent [19]

Brothers et al.

[11] Patent Number: 5,269,589
[45] Date of Patent: Dec. 14, 1993

[54] SNAP LOCK FITTING FOR AUTOMOTIVE SEAT BACKS

[75] Inventors: Dennis Brothers, St. Clair Shores; David Prentkowski, Warren; Majid Arefinejad, Southfield, all of Mich.

[73] Assignee: Bertrand Faure Ltd., Mississauga, Canada

[21] Appl. No.: 753,467

[22] Filed: Sep. 3, 1991

[30] Foreign Application Priority Data

Jan. 25, 1991 [CA] Canada .................................. 2034924

[51] Int. Cl.⁵ ............................................... A47C 7/00
[52] U.S. Cl. .......................... 297/440.16; 297/440.21
[58] Field of Search ............... 297/440, 444; 403/108, 403/328, 374, 409.1; 248/408

[56] References Cited

U.S. PATENT DOCUMENTS

| | | | |
|---|---|---|---|
| 3,377,966 | 4/1968 | Bates et al. | 403/108 X |
| 3,443,784 | 5/1969 | Walkinshaw | 248/408 |
| 3,512,832 | 5/1970 | Kage | 248/408 X |
| 3,525,549 | 8/1970 | Knabusch et al. | 297/440 X |
| 4,395,071 | 7/1983 | Laird | 297/440 |
| 4,586,399 | 5/1986 | Kassai | 403/108 X |
| 4,674,722 | 6/1987 | Danby et al. | 403/374 X |
| 4,679,850 | 7/1987 | Bianchi et al. | 248/408 X |
| 4,850,646 | 7/1989 | Wieland | 297/444 |

Primary Examiner—Kenneth J. Dorner
Assistant Examiner—Milton Nelson, Jr.
Attorney, Agent, or Firm—Patrick J. Hofbauer

[57] ABSTRACT

An automobile seatback subassembly for mutually securing an automobile seat and seat back, and comprising a complimentary pair of mutually interlocking members including an elongated member having a slide with a notched profile intermediate leading and trailing ends thereof, and a channel member comprising a wall arrangement defining an open ended channel for receiving a predetermined maximum length of the mounting member, in axial inter-fitting relation therein. The channel member includes a rotationally biased eccentric cam arranged on a pivot located adjacent the channel with a radially outermost extent of the cam normally biased into inter-fitting relation within the channel in transverse register with the notched profile of the elongated mounting member when the latter is inter-fittingly arranged within the channel. The cam is operably rotatable out of that interfering relation in order to permit the insertion and the withdrawal of the mounting member in the manner described below. The notched profile consists of an axially extending, non-recursive concave spiral surface having a radius of curvature which increases with increasing distance from the leading edge.

12 Claims, 4 Drawing Sheets

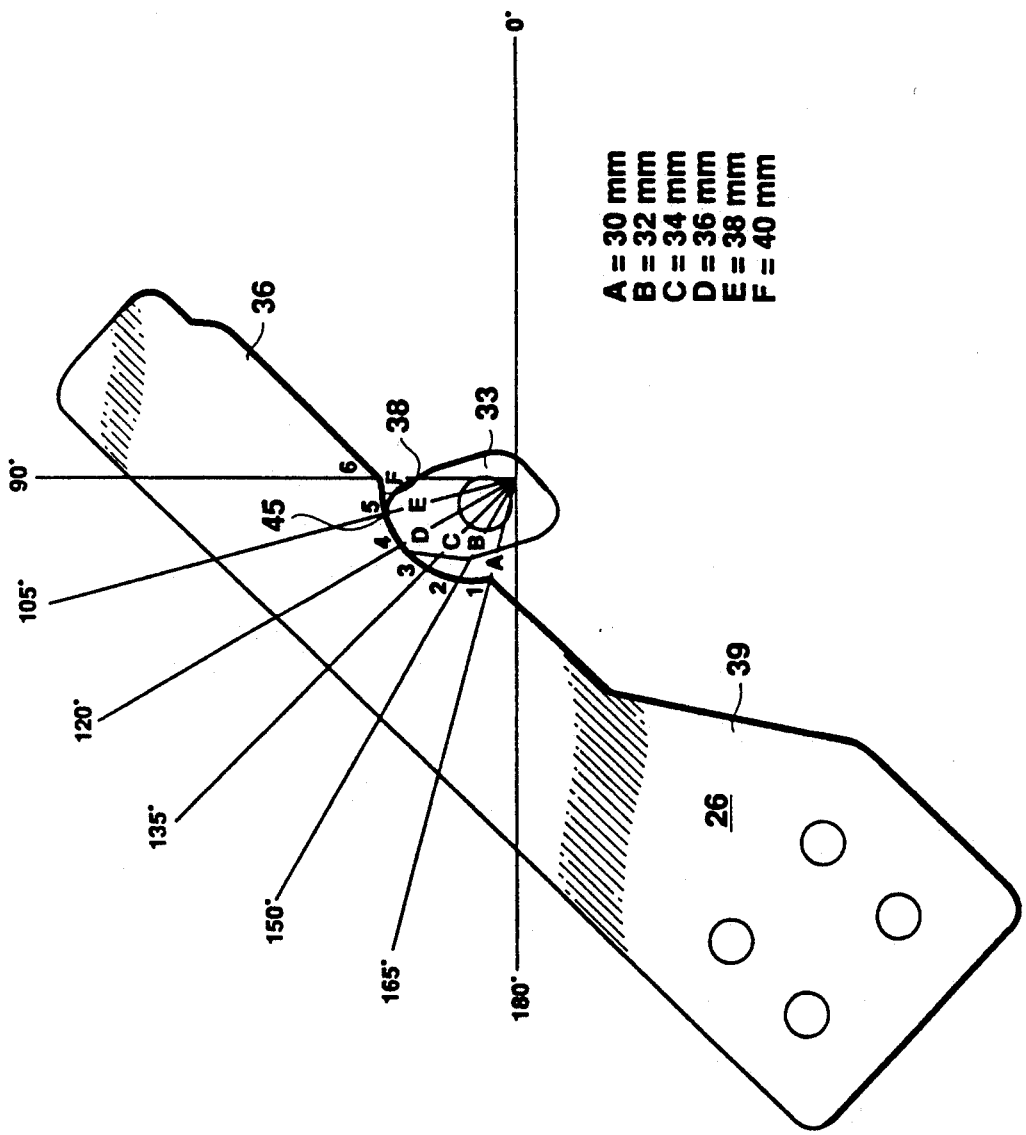

SNAP LOCK FITTING FOR AUTOMOTIVE SEAT BACKS

FIELD OF THE INVENTION

The present invention relates to an apparatus for releasably securing articles mounted thereon, and in particular to apparatus for securing an automotive seat back assembly to an automotive seat cushion assembly.

Automobiles are typically equipped with separate seat back and cushion assemblies which may or may not be joined in hinged relation to one another. In any case, there are substantial advantages associated with the automobile assembly line methods as well as after market cleaning or other maintenance of the automobile seats, if the seat back and cushion assemblies are readily detachable from one another. Such an arrangement must be inexpensive to manufacture, and be able to cope with the relatively large variances in mechanical tolerance associated with mass manufacturing and assembly techniques. Moreover, from a safety perspective, it is necessary that the interlocked connection between the seat back and seat cushion assemblies be as rigid as possible, displaying a minimum of "chuck" under test conditions. This latter requirement is seemingly irreconcilable with the requirement that the interlocking members accommodate the wide variations in mechanical tolerances affecting both the manufacturing and assembly techniques used in mass producing modern automobiles.

U.K. patent application No. 2,120,540 disclosed releasably interlocking members suitable for joining automotive seat back and cushion assemblies. This arrangement illustrates the difficulty of reconciling mass manufacturing and assembly techniques with the requirement for a minimum amount of "chuck". This U.K. patent application teaches an arrangement intended to minimize chuck, but to that end involves a design which demands close tolerance manufacturing and careful assembly. This in turn very substantially, and perhaps even prohibitively, contributes to the cost of the seat assembly and ultimately to the cost of the automobile. In the device taught by the U.K. application a flat ramp on one interlocking member must contact a rotatable cam surface within a very narrowly defined angular "window" in order for the two members to be secured in interlocking relation with a limited amount of chuck. Accordingly, this arrangement demands close manufacturing tolerances between the rotational center and the intersection between the interlocking member and the ramp surface.

Accordingly, there remains a need in the art for interlocking members minimizing the chuck therebetween when locked, which are amenable to mass production and mass assembly techniques typical of those employed in the automobile industry. These members are preferably releasably interlocking.

SUMMARY OF THE INVENTION

The present invention relates to an apparatus comprising a complimentary pair of mutually interlocking members including:

An elongated mounting member having a side with a notched profile intermediate between leading and trailing ends thereof;

A channel member comprising a wall arrangement defining an open ended channel for receiving a predetermined maximum length, (beginning with the leading edge), of the mounting member in axially inter-fitting relation therein. The channel member further includes a rotationally biased eccentric cam arranged on a pivot located adjacent the channel, with a radially outermost extent of the cam normally biased in inter-fitting relation into the channel, and in transverse register with the notched profile when the maximum predetermined length of the mounting member is inter-fittingly arranged within the channel.

The cam is operably rotatable out of inter-fitting relation to permit insertion and preferably also withdrawal of the mounting member.

The notched profile mentioned above consists of an axially extending, non-recursive concave spiral surface having a radius of curvature which increases with increasing distance from the leading edge. The mounting member is adapted to be axially inserted in a mouth formed at the open end of the channel member and to slide along the interior of the channel, in the course of which the leading edge of the mounting member contacts the cam and rotates same about the pivot and out of interfering relation in the channel. The cam is blocked from reentering interfering relation during the continuing axial insertion of the mounting member, by a portion of the side thereof, so as to permit the maximum predetermined length of the mounting member to be inserted into the channel, in which position the notched profile aligns in transverse register with the cam, whose rotational bias then forces the radial outermost extent thereof to follow the curved surface of the notched profile in contacting relation therewith, until the radially outermost extent finds a portion of the surface which is tangential to the radius of that extent and whose intersection is more closely radially spaced apart from the leading edge than is the pivot. In this arrangement the cam engages that portion of the surface in frictionally secured relation and locks the mounting member within the channel against axial withdrawal, preferably only until such time as the cam is operatively rotated against the rotational bias thereof, and out of interfering relation within the channel, whereupon the mounting member is selectively released from locked engagement within the channel member.

More particularly, the present invention embraces an automobile seat assembly wherein a component automobile seat back subassembly includes a pair of laterally spaced apart channel members rigidly secured to a seat back frame. The seat cushion subassembly comprises a complimentary pair of likewise laterally spaced apart elongated mounting members, rigidly affixed to the seat cushion frame.

In any case, the spiral surface mentioned hereinabove ensures that the rotation of the cam will bring the cam and spiral surfaces into tangentially intersecting relation at a point wherein locking forces are properly transferred back through the pivot and into the channel member. Preferably, the spiral surface-contacting portions of the cam present a corresponding spiral surface along the area of contact. This arrangement helps to further minimize chuck, and is relatively highly tolerant of variance in manufacturing. Moreover, because it is essentially self-adjusting the device facilitates mass assembly techniques.

Other advantages and features of the present invention will be more fully appreciated from the detailed description of the invention, and the appended drawings, which are briefly described below.

INTRODUCTION TO THE DRAWINGS

FIG. 11 is a graphical overlay on an elongated member and an interfering cam according to the present invention depicting the respective geometries of the spiral surfaces of these parts.

DETAILED DESCRIPTION

Figure 1:
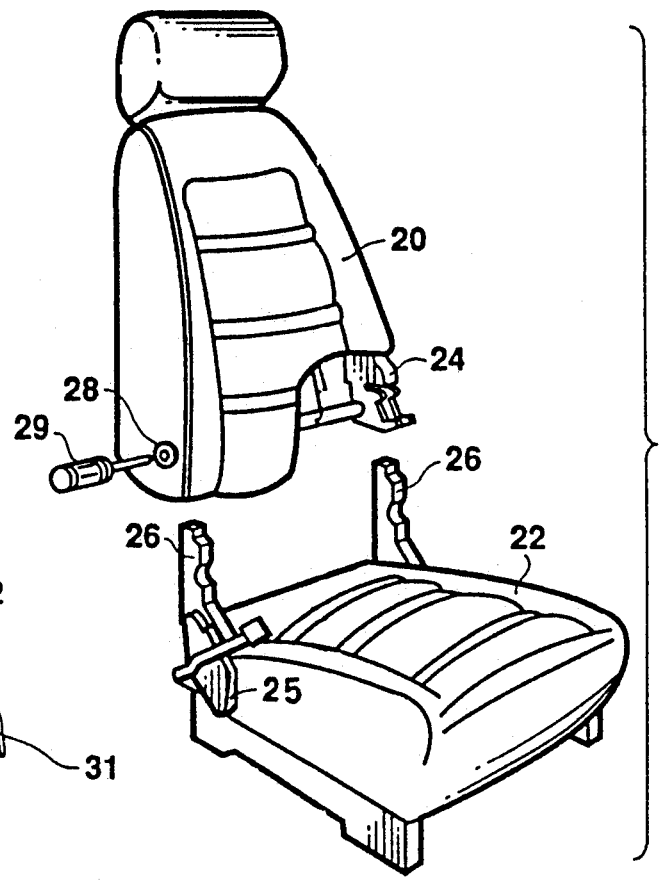
FIG. 1 is a partially exploded view of an automobile seat.

An automobile seat assembly that utilizes the present apparatus is illustrated in FIGS. 1 through 9 of the drawings. As shown in FIG. 1, a seat back 20 is to be mounted on a seat cushion 22. Seat back 20 has a channel member 24 at a vertically lowermost position. Mounting members 26 are each pivotally attached to seat cushion 22, by way of a conventional hinge means 25, to allow the seat back 20 to be reclined. Mounting members 26 have enlarged portions 27 near a vertically lowermost position.

Pivot pin 28 is mounted in the side of the seat back 20 and may be rotated by screw driver 29 to unlatch the complimentary pair of mutually interlocking members 30 of the present invention, and allows seat back 20 to be removed from seat cushion 22 for replacement or repair.

Figure 2:
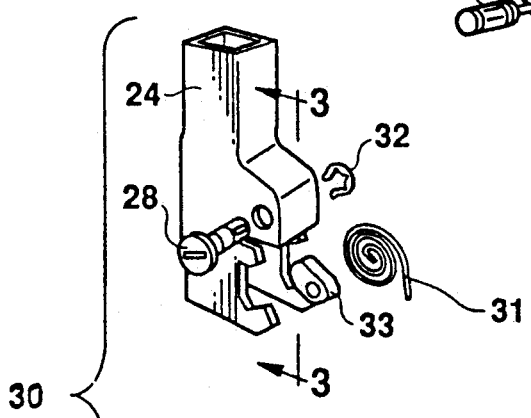
FIG. 2 is an exploded view depicting portions of the complimentary pair of the mutually interlocking members of the present invention.

As shown in FIG. 2, the pair of interlocking members 30 includes pivot pin 28 (extending through an aperture in channel member 24) and receiving torsional cam loading spring 31. Pivot pin 28 extends through the entire lateral extent of channel member 24 and is staked at the lateral end thereof. Cam 33 is also mounted on pivot pin 28 laterally within channel member 24, and adjacent to torsional cam loading spring 31.

Mounting members 26 have a profile including a relatively thin section 34 at a vertically uppermost position, a relatively thick and large section 36, a relatively thin notched profile 38 formed vertically directly below enlarged section 36, and a relatively thick extension section 39 formed vertically directly below notched profile 38.

Figure 3:
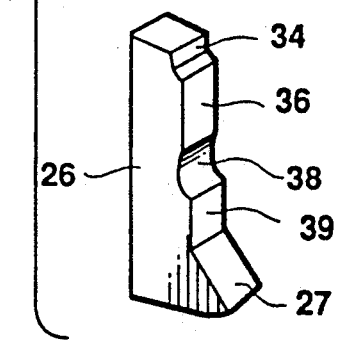
FIG. 3 is a cross-section through a portion of the interlocking members of the present invention.
Figure 3:
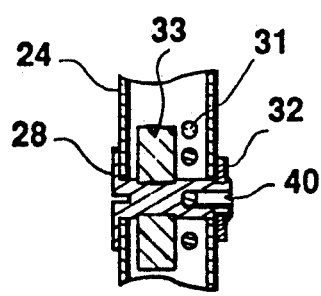

As shown in FIG. 3, pivot pin 28 is fixed to rotate with cam 33. Cam loading spring 31 is mounted in a notch 40 on pivot pin 28 and maintains pivot pin 28 and associated cam 33 in a first rotational position with respect to the center axis of pivot pin 28. The cam is thereby normally rotationally biased into interfering relation within an interior channel defined by channel member 24.

Figure 4:
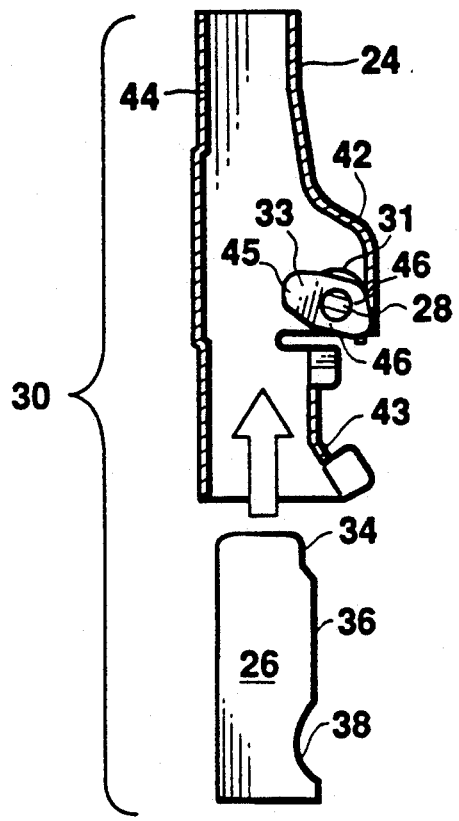
FIGS. 4 through 9 are cross-sections, rotated 90° from the perspective of FIG. 3, showing several steps in the attachment of a seat back to a seat cushion using the complimentary pair of mutually interlocking members of the present invention.

The operation of the interlocking members 30 of the present invention will be explained with reference to FIGS. 4 through 9. As shown in FIG. 4, the interlocking members 30 comprise a channel member 24 and a mounting member 26. Longitudinal wall 42 extends longitudinally forward beyond the nominal extent of channel member 24.

Cam loading spring 31 is mounted against forward wall 42 and rotationally biases pivot pin 28 and associated cam 33 in a counterclockwise direction as shown in FIG. 4, into a first rotational position as described herein above.

Cam 33 has a radially outermost extent 45 that is normally biased rearwardly away from the forward wall 42 and towards rear wall 44 in the first rotational position. Cam 33 further has slim cam passage portions 46 spaced both clockwise and counterclockwise, respectively, on either side of the radially outermost extent 45.

Figure 5:
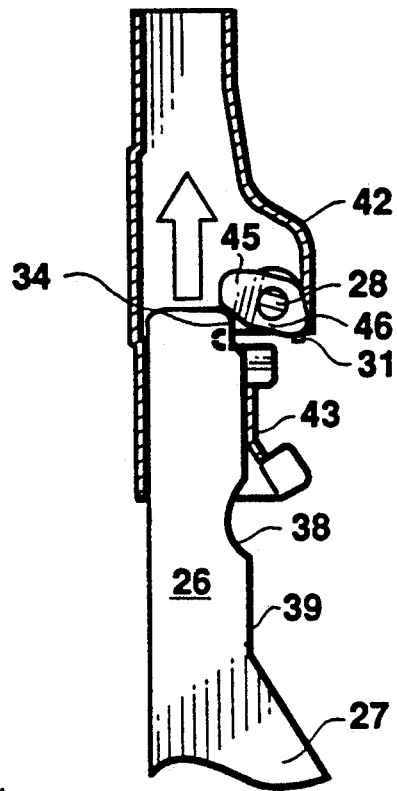

The first step in the attachment of channel member 24 to mounting member 26 is shown in FIG. 5. Mounting member 26 begins entering channel member 24 through mouth portion 43, which is relatively wide with respect to the nominal dimension of the channel member 24. Entry section 34 is relatively thin with respect to other portions of mounting member 26 and thus a robotic assembler will not necessarily have undue difficulty aligning the two parts 24 and 26, even allowing for a wide variance in manufacturing and assembly tolerances. As channel member 24 continues to be forced downwardly on mounting member 26, entry section 34 eventually contacts a portion of cam 33.

Figure 6:
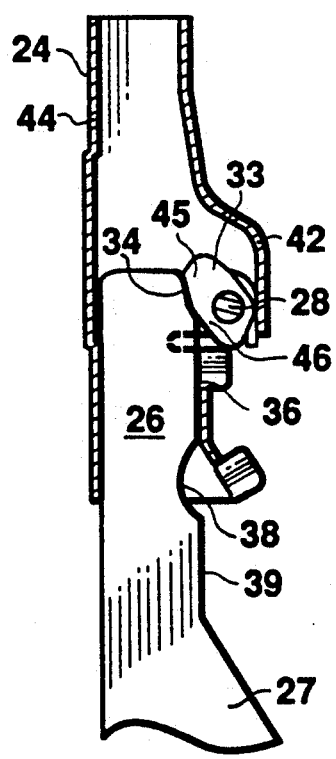

As seen in FIG. 6, the contacting of cam 33 by entry section 34 overcomes the spring bias from cam loading spring 31 and rotates cam 33 in a clockwise direction against this bias. When cam 33 rotates clockwise, the relatively slim cam passage section 46 is also moved clockwise and faces the rear wall 44.

Figure 7:
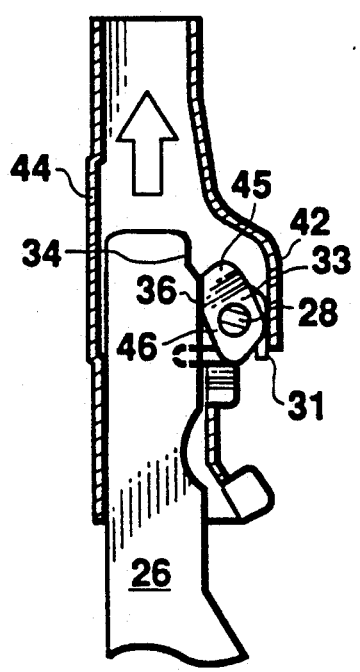

As shown in FIG. 7, the further advance of enlarged section 36 further rotates cam 33 such that slim cam passage section 46 is aligned almost parallel with recliner pivot arm 26. The relatively thin profile of cam passage section 46 allows enlarged section 36 to pass along cam 33. Channel member 24 and the associated seat back are moved vertically downwardly along enlarged section 36 and further into mounting member 26.

Figure 8:
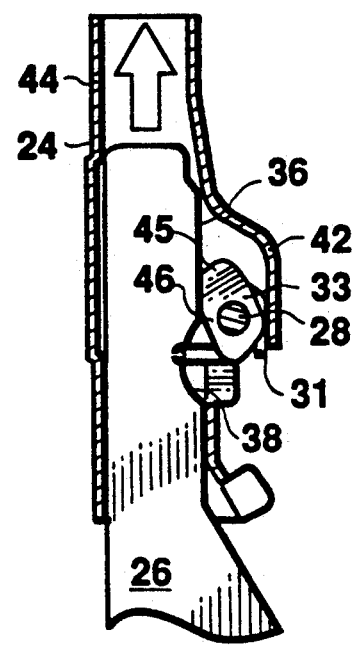

As shown in FIG. 8, cam 33 moves upwardly along enlarged section 36 and is maintained in its clockwise rotation against the bias of cam loaded spring 31.

Figure 9:
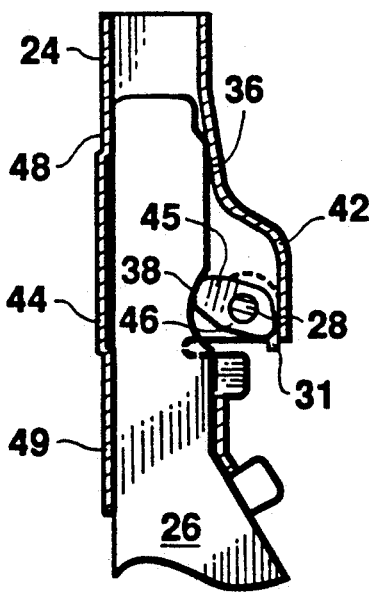

As shown in FIG. 9, channel member 24 eventually is moved downwardly upon mounting member 26 to such an extent that cam 33 is moved beyond the enlarged section 36. At this point, the bias from the cam loading spring 31 will rotate cam 33 in a clockwise direction from the unnatural position where it was maintained by enlarged section 36, towards a latching position illustrated in FIG. 9. The radially outermost extent of cam 33 does not return completely to the first rotational position when at this latching position, but is instead received in the notched profile 38. Cam loading spring 31 will constantly bias cam 33 counterclockwise toward the first rotational position and will create a force on mounting member 26 towards rear wall 44 and vertically downwardly.

When channel member 24 is latched with mounting member 26, mouth portion 43 is further aligned with enlarged portion 27 which has a shape that is complimentary to that of mouth portion 43, and ensures that members 24 and 26 are firmly held together by means of a frictional wedging action. In addition, enlarged section 27 provides a stop to prevent over insertion of member 26 within member 24. Extension section 39 ensures that the connection of cam 33 and notched profile 38 is at a position vertically removed from the pivoted connection between mounting members 36 and seat cushions 22.

Support portions 48 and 49 extend from rear wall 44 longitudinally, towards forward wall 42 and are disposed vertically above and below cam 33. The bias of cam 33 against pivot arm 26 forces it against support portions 48 and 49 and the reactive forces from support portions 48 and 49 are spaced vertically above and below cam 33. This arrangement prevents slippage between members 26 and 24, and results in a secure connection between the two.

Figure 10:
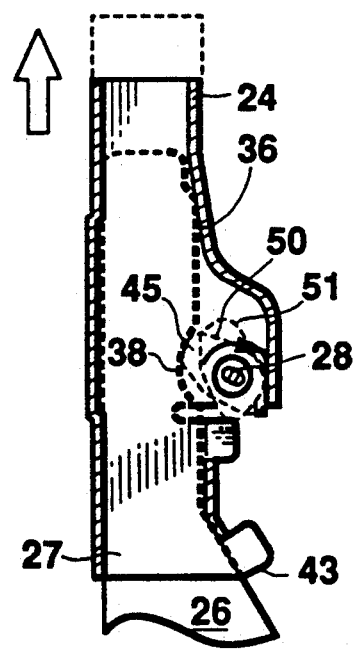
FIG. 10 is a cross-section in a perspective similar to FIGS. 4 through 9, but instead showing the disassembly of a seat back from a seat cushion utilizing a complimentary pair of mutually interlocking members according to the present invention.

A method for the removal of member 24 and the associated seat back 20 from member 26 and its associated seat cushion 22 can be readily understood from FIG. 10, particularly when taken in view of FIG. 1. As shown in FIG. 1, screw driver 29 (or a similar tool for a dedicated lever as the case may be), can rotate pivot pin 28, along with cam 33 from a latching position 50 against the force of cam loading spring 41 to an unlatching position 51 at which the radially outermost extent 45 of cam 33 is removed from notched profile 38 and slim cam passage section 46 faces rear wall 44. Once cam 33 has been rotated against the force of cam loading spring 31 in this manner, channel member 24 can be moved vertically upwardly along enlarged section 36 of mounting member 26, for removal of the seat back 20 from the seat cushion 22. Both of the channel members 24 arranged on either side of the seat back 20 have associated therewith a pivot pin 28 which must be rotated in the manner described hereinabove in order to permit removal of seat back 20 from seat cushion 22.

Referring now to FIG. 11, there is illustrated a graphical overlay superimposed on a preferred mounting member 26 and cam 33, in accordance with the present invention. As illustrated, the radial outermost extent 45 is arranged to mate in axial register with notched profile 38, on mounting member 26.

The graphical overlay maps the spiral curvature of the respective contacting surface portions of notched profile 38 and radially outermost extent 45, in reference to 15° incremental reference angles, and the distance of the corresponding radii extending from a common point of origin to respective portions of the surfaces. In this arrangement, the cam 33 readily finds its own rotational position for achieving a closest fit with an adjacent surface portion of notched profile 38, where it engages in a wedgingly interfering relation that enhances not only the resistance to untimely or unintentional axial withdrawal of member 26 from channel 24, but also dampens axial vibration as the fit between the two surfaces becomes tighter over time. This serves the very material advantage of accommodating the relatively large physical clearances between the mechanical components used in the mass production of automotive parts. At the same time, this arrangement takes full advantage of ease of assembly that is facilitated by way of this seat back mounting device.

It will be apparent to those skilled in the art that various modifications can be made to the disclosed embodiment without departing from the spirit and scope of the present invention, which is defined by the appended claims.

We claim:

1. A complimentary pair of mutually interlocking members including an elongated mounting member having a slide with a notched profile intermediate between leading and trailing ends thereof;

a channel member comprising a wall arrangement defining an open ended channel for receiving a predetermined length of said mounting member in axially inter-fitting relation therewith, said channel member further including a rotationally biased eccentric cam arranged on a pivot located adjacent said channel, with a radially outermost extent of said cam normally biased into interfering relation within said channel, and in transverse register with the notched profile when said maximum predetermined length of the mounting member is inter-fittingly engaged within said channel, said cam being operably rotatable about said pivot out of said interfering relation with said channel upon initial contact with said mounting member to permit insertion of said mounting member;

and wherein said notched profile consists of an axially extending, non-recursive concave spiral surface having a radius of curvature which increases with increasing distance from a leading edge of said mounting member.

2. Interlocking members according to claim 1 wherein said cam is also operably rotatable out of interfering said relation to permit selective withdrawal of said mounting member from said channel member.

3. The mutually interlocking members according to claim 1 wherein said cam and said notched profile have mutually adjacent complimentary spiral surfaces.

4. The mutually interlocking members according to claim 1 wherein at least one of said members includes hinge means.

5. An automobile seat back subassembly for mutually securing an automobile seat and seat back, comprising a complimentary pair of mutually interlocking members including an elongated mounting member having a slide with a notched profile intermediate between leading and trailing ends thereof;

a channel member comprising a wall arrangement defining an open ended channel for receiving a predetermined length of said mounting member in axially inter-fitting relation therewith, said channel member further including a rotationally biased eccentric cam arranged on a pivot located adjacent said channel, with a radially outermost extent of said cam normally biased into interfering relation within said channel, and in transverse register with the notched profile when said maximum predetermined length of the mounting member is inter-fittingly engaged within said channel, said cam being operably about said pivot rotatable out of said interfering relation with said channel upon initial contact with said mounting member to permit insertion of said mounting member;

and wherein said notched profile consists of an axially extending, non-recursive concave spiral surface having a radius of curvature which increases with increasing distance from a leading edge of said mounting member.

6. Interlocking members according to claim 5 wherein said cam is also operably rotatable out of said interfering relation to permit selective withdrawal of said mounting member from said channel member.

7. The mutually interlocking members according to claim 5 wherein said cam and said notched profile have mutually adjacent complimentary spiral surfaces.

8. The mutually interlocking members according to claim 5 wherein at least one of said members includes hinge means.

9. An automobile seat comprising a seat back portion and a seat portion adapted to be mutually secured through a complimentary pair of mutually locking members including an elongated mounting member secured to said seat portion and having a side with a notched profile intermediate between leading and trailing ends thereof;

a channel member secured to said seat back portion and comprising a wall arrangement defining an open ended channel for receiving a predetermined length of said mounting member in axially inter-fitting relation therewith, said channel member further including a rotationally biased eccentric cam arranged on a pivot located adjacent said channel, with a radially outermost extent of said cam normally biased into interfering relation within said channel, and in transverse register with the notched profile when said maximum predetermined length of the mounting member is inter-fittingly engaged within said channel, said cam being operably rotatable out of inter-fitting relation to permit insertion of said mounting member;

and wherein said notched profile consists of an axially extending, non-recursive concave spiral surface having a radius of curvature which increases with increasing distance from a leading edge of said mounting member.

10. Interlocking members according to claim 9 wherein said cam is operably rotatable in and out of interfering relation to permit insertion and selective withdrawal of said mounting member from said channel member.

11. The mutually interlocking members according to claim 9 wherein said cam and said notched profile have mutually adjacent complimentary spiral surfaces.

12. The mutually interlocking members according to claim 9 wherein at least one of said members includes hinge means.

* * * * *